Patented Mar. 26, 1935

1,995,519

UNITED STATES PATENT OFFICE 1,995,519

MOLASSES PRODUCT AND METHOD OF PRODUCING THE SAME

Harry C. Reiner, Clayton, Mo.

No Drawing. Application April 13, 1932,
Serial No. 605,118

5 Claims. (Cl. 99—11)

This invention relates to a certain new and useful molasses-product and to a method of producing the same.

A residue from the manufacture of raw cane sugar is commonly known and designated as black-strap molasses. This residue contains mineral salts and organic elements particularly of value as constituents, for example, in stock foods and the like.

However, black-strap molasses, because of its high moisture or water content, averaging from twenty-four to twenty-eight percent, is subject to fermentation; hence transportation of black-strap molasses to points distant from its source of production, and likewise merely brief storage of the molasses, is rendered wholly impracticable; and its use as an article for general sale as a stock-food in agricultural districts, for example, is, therefore, of extremely limited application.

The black-strap molasses may readily be dried to a powder of such low moisture content as to substantially avoid fermentation and other deleterious conditions produced by the normal water content of the raw molasses; however, again, the molasses when so dried is hygroscopic, and if stored for any length of time the absorbed or adsorbed moisture causes the consolidation of the molasses powder into lumps and solid masses, rendering the dried molasses unfit for its intended purposes.

Now, I have found that, if a suitable pulverulent inorganic substance be intimately mixed with the dried molasses powder the resulting product is substantially non-hygroscopic in character and may be safely stored for relatively long periods of time and under most unfavorable humidity conditions without loss of its powdery characteristics and without impairment of the valuable stock-food properties of the molasses product.

In furthering my discovery and in carrying the same into practice, I employ a suitable dehydrating apparatus preferably of the type known as a spray-evaporator, wherein the liquid molasses is converted into solids in one operation. For this purpose, it is necessary that the liquid be divided or atomized into very small particles before it is brought into contact with the heated air or gases of the evaporator. Accordingly, the normally viscous black-strap molasses is diluted with water in suitable quantity and heated to or about 190 degrees F. The so-diluted and heated black-strap syrup is then sprayed or discharged through and from suitable spray nozzles under suitable pressure into the evaporator chamber for producing a highly atomized spray composed of minute particles, which, being agitated by the air currents in the evaporator, are with great rapidity deprived of substantially all or most of their moisture content by warm air circulated, preferably with cyclonic effect, through the evaporator chamber.

The resulting dried material tends to fall to the bottom of the evaporator as minutely-sized, particulate or pulverulent material hygroscopic in character and having about four percent moisture, more or less. The powder-particles are characterized by being of a highly sticky nature, and for avoiding agglomeration of the powder-particles, suitable agitator-air currents are directed into the evaporator chamber for maintaining the dried molasses powder in an aerated or suspended state therein.

While thus maintaining the molasses powder in its aerated state within the evaporator chamber, I introduce into said chamber a suitable quantity of pulverulent or powdered inorganic material substantially devoid of hygroscopic properties and preferably comprising calcium-carbonate or limestone.

While any suitable mixing mechanism may be employed, I prefer to blow the pulverulent inorganic constituent into the cyclone dryer with a cyclonic or whirling-air agitation causing a mixing action highly effective for bringing the particles of the limestone into intimate contact with the molasses-powder, the latter being meanwhile continued or maintained in an aerated state by the air-currents in the evaporator chamber. The particles of the molasses powder, by reason of their adhesive qualities or sticky nature, soon effect a union with the particles of the limestone powder, whereby the agglomerative characteristic of the dried molasses residue is most effectively substantially destroyed.

The resulting non-agglomerative product is likewise in a pulverulent or finely grained powder-like state, substantially non-hygroscopic in character, and having a considerably paler color than that of the dried-molasses powder-product of the evaporating process.

The agitating air currents are then shut off while the cyclonic air-currents are continued, whereby the resulting product of the intimate mixture of the substantially dry particulate molasses-residue with the pulverulent limestone is automatically collected in the bottom of the evaporator chamber and removed therefrom for consumer use. If the collected powdery product is in too highly aerated condition, it may be passed through a suitable separator preferably in closed-circuit with the evaporator, for removal of the entrained air.

In practice, I have found that the molasses-residue or black-strap may be rendered non-hygroscopic sufficiently for commercial purposes by mixing or uniting therewith merely a relatively minor proportion of the limestone, the final non-hygroscopic molasses product being composed for the most part of the dried molasses-powder.

The resulting product may safely be stored in bulk for a considerable period of time without deterioration of its powdery qualities and likewise may be sacked, boxed, barrelled, or otherwise put up in containers and stored in warehouses or on the farm most conveniently for consumer use in small quantities at a time, whereby the field of utility and sale of the molasses-product may be greatly and profitably expanded and increased.

The process may be carried out with minimum expenditure of time and equipment; the resulting product may, therefore, be most economically produced at or near the source of the molasses residue and shipped to the consumer as required, which factors contribute to the value of the product for its intended uses, for example, as a stock-food and the like.

It will be understood that my invention is not dependent upon the literal correctness of the theory or theories set forth herein, the principal desideratum being to incorporate in the final product such relatively minor percentage of a moisture-inert material as will suffice to render the major percentage of the substantially-dried molasses-residue also substantially non-hygroscopic in character.

Having thus described my invention, what I claim and desire to secure by Letters Patent is,—

1. That process which consists in effecting an intimate mixture of substantially dehydrated molasses-residue in powdered form with pulverulent limestone for forming a non-hygroscopic product substantially devoid of agglomerative characteristics.

2. That process which consists in first drying a molasses-residue to a powdered form, and then while preventing agglomeration of the dried material intimately mixing the same with pulverulent limestone for substantially destroying the agglomerative characteristics of the molasses material.

3. That process which consists in drying a molasses-residue to a powdered form under air-agitation, and then while continuing the air-agitation of the dried molasses effecting intimate mixture thereof with pulverulent limestone until the resulting product is substantially devoid of agglomerative characteristics.

4. The process of producing a composition of matter having the form of substantially non-hygroscopic dry powder and comprising an intimate mixture of a particulate dehydrated molasses-residue and pulverulent limestone, which consists in preparing the molasses-residue for spraying purposes, spraying the treated molasses-residue in a dehydrating apparatus for production of a substantially dried product in an aerated state, and then while maintaining said product in its aerated condition causing an intimate mixture thereof with pulverulent limestone.

5. The process of producing a composition of matter having the form of a non-hygroscopic dry powder and comprising an intimate mixture of a particulate dehydrated molasses-residue and pulverulent limestone, which consists in preparing the molasses-residue for spraying purposes, spraying the treated molasses-residue in a dehydrating apparatus for production of a substantially dried product in an aerated state, and then while maintaining said product in its aerated condition blowing the limestone into the apparatus with a whirling agitation for effecting intimate mixture of the limestone and molasses-residue.

HARRY C. REINER.